(12) United States Patent
Djakovic et al.

(10) Patent No.: US 10,491,382 B2
(45) Date of Patent: Nov. 26, 2019

(54) SECURE AUTHENTICATION OF DEVICES WITHOUT SERVER ASSISTANCE OR PRE-SHARED CREDENTIALS

(71) Applicant: iDevices, LLC, Avon, CT (US)

(72) Inventors: Vladan Djakovic, San Francisco, CA (US); Shelby Noonan, Los Gatos, CA (US)

(73) Assignee: iDevices, LLC, Avon, CT (US)

( * ) Notice: Subject to any disclaimer, the term of this patent is extended or adjusted under 35 U.S.C. 154(b) by 119 days.

(21) Appl. No.: 15/678,699

(22) Filed: Aug. 16, 2017

(65) Prior Publication Data

US 2018/0054305 A1   Feb. 22, 2018

Related U.S. Application Data

(60) Provisional application No. 62/375,658, filed on Aug. 16, 2016.

(51) Int. Cl.
| | |
|---|---|
| H04L 29/06 | (2006.01) |
| H04L 9/08 | (2006.01) |
| H04L 9/14 | (2006.01) |
| H04W 12/02 | (2009.01) |
| H04W 12/04 | (2009.01) |
| H04W 12/06 | (2009.01) |

(52) U.S. Cl.
CPC .......... *H04L 9/0838* (2013.01); *H04L 9/0861* (2013.01); *H04L 9/0872* (2013.01); *H04L 9/0894* (2013.01); *H04L 9/14* (2013.01); *H04L 63/0428* (2013.01); *H04L 63/061* (2013.01); *H04L 63/0869* (2013.01); *H04W 12/02* (2013.01); *H04W 12/04* (2013.01); *H04W 12/06* (2013.01); *H04L 2209/805* (2013.01); *H04L 2463/121* (2013.01)

(58) Field of Classification Search
CPC ... H04L 9/0838; H04L 9/0861; H04L 9/0872; H04L 9/0894; H04L 9/14; H04L 63/0428; H04L 63/061; H04L 63/0869; H04L 2209/805; H04L 2463/121; H04W 12/02; H04W 12/04; H04W 12/06; H04W 4/70; H04W 12/00508
See application file for complete search history.

(56) References Cited

U.S. PATENT DOCUMENTS

| | | |
|---|---|---|
| 7,427,926 B2 | 9/2008 | Sinclair et al. |
| 8,907,768 B2 | 12/2014 | Faith et al. |

(Continued)

OTHER PUBLICATIONS

International Search Report and Written Opinion of the International Searching Authority for International Application No. PCT/US2017/047150, dated Nov. 8, 2017, 10 pages.

(Continued)

*Primary Examiner* — Yogesh Paliwal
(74) *Attorney, Agent, or Firm* — Dority & Manning, P.A.

(57) ABSTRACT

Systems and methods for establishing secure communication between electronic devices. In some aspects, at least two computing devices physically interact with each other multiple times, and sensors in each device detect and record the times of the physical interactions. The times of the physical interactions are used as time secrets, which are used as a basis for generating a cryptographically secure key used as a shared secret among the devices to provide secure communications therebetween.

28 Claims, 8 Drawing Sheets

(56) References Cited

U.S. PATENT DOCUMENTS

| | | | |
|---|---|---|---|
| 8,931,400 | B1 | 1/2015 | Allen |
| 9,176,543 | B2 | 11/2015 | Faith et al. |
| 2007/0188323 | A1 | 8/2007 | Sinclair et al. |
| 2010/0167646 | A1 | 7/2010 | Alameh et al. |
| 2010/0278342 | A1* | 11/2010 | Pering .................. H04L 9/0827 380/270 |
| 2014/0199967 | A1 | 7/2014 | Varoglu et al. |
| 2015/0117645 | A1* | 4/2015 | Carlson .............. H04L 63/0435 380/262 |
| 2015/0350167 | A1 | 12/2015 | Djakovic |
| 2016/0044447 | A1 | 2/2016 | Tetreault et al. |
| 2016/0209899 | A1 | 7/2016 | Brantner et al. |

OTHER PUBLICATIONS

PCT International Preliminary Report on Patentability for corresponding PCT Application No. PCT/US2017/047150, dated Feb. 19, 2019, 8 pages.

Lester, J., Hannaford, B., Borriello, G., "'Are you with me?'—Using Accelerometers to Determine if Two Devices are Carried by the Same Person," Lecture Notes in Computer Science, vol. 3001, 2004, Springer, Berlin, Heidelberg, pp. 1-18, available at http://courses.cs.washington.edu/courses/cse477/projectwebs04sp/cse477ciproject/docs/ReadforTh0415.pdf.

Castelluccia, C., Mutaf, P., "Shake them up!: A movement-based pairing protocol for CPU-constrained devices," ACM, New York, Jun. 2005, pp. 51-64, available at https://www.usenix.org/legacy/publications/library/proceedings/mobisys05/tech/full_papers/castelluccia/castelluccia_new_html/index.html.

Kirovski, D., Sinclair, M., Wilson, D., "The Martini Synch: Using Accelerometers for Device Pairing," Microsoft Research, Washington, Sep. 2007, pp. 1-16, available at http://citeseerx.ist.psu.edu/viewdoc/download?doi=10.1.1.88.6387&rep=rep1&type=pdf.

Saxena, N., Borhan U., "Blink 'Em All: Scalable, User-Friendly and Secure Initialization of Wireless Sensor Nodes," 2009, Springer, Berlin, Heidelberg, pp. 154-173.

Barbier, J., Krzakala F., Zdeborova, L., Zhang, P., "Robust error correction for real-valued signals via message-passing decoding and spatial coupling," IEEE Information Theory Workshop (ITW 2013), 2013, pp. 1-5.

* cited by examiner

SECURE AUTHENTICATION OF DEVICES WITHOUT SERVER ASSISTANCE OR PRE-SHARED CREDENTIALS

CROSS-REFERENCE TO RELATED APPLICATIONS

This patent application claims benefit under 35 U.S.C. § 119 to U.S. Provisional Patent Application Ser. No. 62/375,658, filed Aug. 16, 2016, entitled "Secure Authentication of Devices Without Server Assistance or Pre-Shared Credentials," which is hereby expressly incorporated by reference in its entirety as part of the present disclosure.

FIELD OF THE INVENTION

The present invention relates to systems and methods for establishing secure communication between electronic devices.

BACKGROUND OF THE INVENTION

There are an increasing number of devices on the market currently that users communicate with via radio communication using smartphones or other computers. These devices are collectively referred to by some as the "Internet of Things." These devices may be intended for use in the user's home or work. These devices can be, for example, smart devices such as, but not limited to, power outlets and plugs, lamps, thermometers, washing machines, televisions, and garage door openers. These devices can be targets for third parties that wish to take over control of the devices from the user or obtain personal, private of confidential information. For example, a third party who obtains access to a smart device that is connected to or has access to a network in someone's home or office may be able to further infiltrate the network and take control of other devices that are connected to or accessible via the network, such as embedded cameras or security systems, the door locks, or computers storing sensitive data. Moreover, if these devices have access to the internet, one gaining access to these smart devices may use them as an attack vector for infiltration of a user's or another's network over the internet. Therefore, such devices are often secured against access by third parties. Indeed, as communication with these devices may involve transfer of sensitive information, e.g., credentials, to access the local network, and other sensitive information that devices send or receive, radio communication between the controlling smartphone/computer and the device itself is often secure.

Typically, after purchasing the device and powering it ("taking out of the box"), the user uses the smartphone or other computer to connect to a device via radio communication. This is sometimes called "pairing." Pairing usually consists of establishing mutual credentials for future communication, for example using a mutual key exchange or, in less-sensitive devices, pairing without a key. Alternatively, a device may be added to the local wireless network by configuring the device with a password and access protocol for the network. Alternatively, a pairing process (such as Wi-Fi Protected Setup) may be used to add devices to the network, for example, by causing a wireless router and the device to go into a "pairing mode" in order to configure the device with credentials to access the network.

However, the radio waves used by these devices to communicate can propagate in all directions and may be detected from far away with properly configured antennas, even if the transmitter is intentionally weak (in attempt to prevent communication with faraway radios). Radio range depends on the antenna gain, transmitter power and receiver sensitivity. While, commonly, devices and smartphones/computers may have "short radio range" due to low power transmitters and low gain antennas, an attacker can deploy equipment that can extend this range, in some instances, many orders of magnitude. For example, it has been demonstrated that BLE (Bluetooth Low Energy) devices, which are considered to have a short range of tens of feet, can be successfully accessed from ¼ mile away with appropriate radio equipment. The target device cannot distinguish a faraway transmitter using an appropriate high-gain antenna from a local transmitter. Due to the possibility that there are other "devices" unknown to the user that may impersonate or mimic the device with which the user is trying to pair by providing fake or misleading communications, or the possibility that there are radio receivers with high gain antennae receiving the user's communication(s), it is desirable to protect this communication in some way so that only the intended target device is able to communicate. The user's smartphone or computer thus authenticates the target device, so that only that intended device receives or can access the communicated information, while no other devices or computers can do so.

Previously-known authentication is done by some combination of:

A user puts the target device and the smartphone/computer into "pairing mode" at approximately the same time. However, this provides secure communications only if no other devices or computers in radio range are in pairing mode. If other devices are in radio range, those other devices can pair with the target device and/or the smartphone/computer (the user may not detect that it is pairing with the other device and not the target device);

A user reads a unique code permanently printed on or displayed by the device ("PIN"), and enters it into the smartphone/computer. However, this provides secure communication only if no one else has previously read that code, and/or does not have access to that code in the future. Otherwise, the device may be compromised; and/or A manufacturer embeds credentials in all devices that can be verified by all smartphones using an application, e.g., a UUID. This prevents real-time hijacking, but does not protect against reverse-engineering of the smartphone software to extract these credentials. Manufacturers often manufacturers use the same secret password or key in all devices of one type. Thus, once the credentials are extracted, an entire group or class of product may be subject to compromise.

All these approaches are inherently insecure. There previously existed no strong and positive affirmation that the smartphone/computer is indeed communicating with the intended device, and with no one else. Previously-known authentication links between devices are weak, as described above, and intruders can easily intercept or hijack the communication and obtain the transmitted information. The devices can be subjected to a "man-in-the-middle" attack where the attacker computer pairs with the device and then mimics the device to the smartphone, leaving the user unaware of the security breach.

Some previously-known procedures use physical actions to bound the time of radio interaction, by using backend servers. Even when trajectory similarity is used, though, it only signifies that a pairing can start—it does not contribute to the shared secret. An attacker can circumvent these approaches.

SUMMARY OF THE INVENTION

In view of the above, there is a need for systems and methods that can provide more secure electronic communications between devices. The present disclosure discusses methods and systems for overcoming deficiencies in the prior art, and presents methods for establishing a shared secret without exposing the communication to potential interception by third-parties.

It is an object of certain embodiments of the invention to improve security of communications between devices. In some aspects, a short-lived one-time shared secret between the handset/computer and the target device is established without using radio communication or any third party services (such as backend server or similar) The shared secret may be unique to a particular pairing session between two particular physical objects or devices, may never be transmitted by the radio, and, in some embodiments, may be used only once. This shared secret may then be used in the subsequent radio communication for mutual authentication and initial privacy, to establish a secure authenticated communication channel. The pairing then may proceed as usual, but now it is secured against unauthorized use of the shared secret or impersonation (i.e., snooping), because the secret has not been shared in a manner that can be readily observed by a third party.

In some embodiments, the shared secret is a substantially long or difficult secret or otherwise hard to guess (e.g., an AES-256 bit key), enhancing the security of the communication. In some embodiments, the shared secret may be derived from a non-electronic event or action, which may involve no electronic communication between devices. In such embodiments, then, no third party can observe or guess the event or action, or the basis of the shared secret, using electronic equipment, (e.g., a radio receiver) and/or from a remote location. In some embodiments, one or more physical interactions occur between the two or more devices. For example, a user may knock the devices together multiple times. The time(s) between these physical interactions may be used to define a time value secret or time value secret value that is known only to the devices. This time value secret may be used to generate a key that may be used as a shared secret between devices. Thus, the devices can verify that communication among them is secure because only those devices possess the encryption key necessary to decrypt messages between them. A third party attempting to infiltrate the communication will not be able to decrypt the messages in the absence of the time value secret (and accordingly, the resulting key). This represents an important improvement over prior art methods of establishing shared secret secure communications, which traditionally require sharing or configuring the devices using identical, pre-shared keys, and such sharing or configuration exposes the key to being intercepted or otherwise compromised.

In one aspect, a method of establishing secure communications between at least two devices is performed. The method may include detecting a first physical interaction between a first computing device and a second computing device and storing in memory a timestamp of the first physical interaction (e.g., with a computer processor), and detecting a second physical interaction between the first computing device and the second computing device and storing that timestamp in memory. A first time value secret is then determined using, based on or derived from the timestamp of the first physical interaction and the timestamp of the second physical interaction. An encryption key may be generated using, based on, or derived from the first time value secret, and at least one encrypted validation message is encrypted using the encryption key. The encrypted validation message(s) is then transmitted from one device to another (wirelessly or otherwise). In response, an encrypted confirmation message is received, and an attempt is made to decipher the encrypted message using the encryption key. If successful, the devices proceed to communication using the encryption key. In further embodiments, a set of encryption keys is generated. If the attempt to decipher the encrypted confirmation message fails using one of the keys in the set, further attempts are made using other keys in the set.

In some embodiments, a variant of the timestamp of the second physical interaction is calculated by adding or subtracting a unit of time to the timestamp of the second physical interaction. A second time value secret is then determined using, based on or derived from the timestamp of the first physical interaction and the variant timestamp of the second physical interaction. Next, a second encrypted key is generated using, based on, or derived from the second time value secret, and a second encrypted validation message (or messages) is encrypted using the second encryption key, and transmitted. If the attempt to decipher the encrypted confirmation message fails, an attempt to decrypt the message using the second encryption key is made. If this attempt is successful, the devices proceed to communicate using the second encryption key.

In a further embodiment, the encryption key is generated using a key derivation function. In another embodiment, the first time value secret is determined using a difference between the timestamp of the first physical interaction and the timestamp of the second physical interaction. In a further embodiment, the first time value secret is rounded to a number of significant digits less than a response time of the sensor. In another embodiment, the first time value secret includes an entropy generated by a user during occurrence of one or more of the first physical interaction or the second physical interaction. In another embodiment, the sensor is an accelerometer, a microphone, a light sensor, a button, or an electromagnetic radiation sensor. In a further embodiment, the sensor the sensor is an accelerometer and the timestamp of the first physical interaction corresponds to a peak accelerometer reading during the first physical interaction.

In other embodiments, a random user instruction timer is generated, e.g., a countdown timer. When the random user instruction timer is exhausted or reaches zero, an instruction to perform the first physical interaction is generated, such as, for example, on a display screen. In some such embodiments, the random user instruction timer is generated using an entropy accumulated in a device generating the instruction.

In another aspect, a computer program or application ("app") establishes, at least in part, secure communications between multiple devices. The computer program may perform, or causes to be performed (e.g., when executed), a method including detecting a first physical interaction between devices and storing in memory a timestamp of the first physical interaction (e.g., with a computer processor), and detecting a second physical interaction between the devices and storing that timestamp in memory. A first time value secret is then determined using, based on or derived from the timestamp of the first physical interaction and the timestamp of the second physical interaction. An encryption key may be generated using, based on, or derived from the first time value secret, and at least one encrypted validation message is encrypted using the encryption key. The encrypted validation message(s) is then transmitted by from one device to another (wirelessly or otherwise). In response, an encrypted confirmation message is received, and an attempt is made to decipher the encrypted message using the encryption key. If successful, the devices proceed to communication using the encryption key. In further embodiments, a set of encryption keys is generated. If the attempt to decipher the encrypted confirmation message fails using one of the keys in the set, further attempts are made using other keys in the set.

In some embodiments, a variant of the timestamp of the second physical interaction is calculated by adding or subtracting a unit of time to the timestamp of the second physical interaction. A second time value secret is then determined using, based on or derived from the timestamp of the first physical interaction and the variant timestamp of the second physical interaction. Next, a second encrypted key is generated using, based on, or derived from the second time value secret, and a second encrypted validation message (or messages) is encrypted using the second encryption key, and transmitted. If the attempt to decipher the encrypted confirmation message fails, an attempt to decrypt the message using the second encryption key is made. If this attempt is successful, the devices proceed to communicate using the second encryption key.

In a further embodiment, the first encryption key is generated using a key derivation function. In another embodiment, the first time value secret is determined using a difference between the timestamp of the first physical interaction and the timestamp of the second physical interaction. In a further embodiment, the first time value secret is rounded to a number of significant digits less than a response time of the sensor. In another embodiment, the first time value secret includes an entropy generated by a user during occurrence of one or more of the first physical interaction or the second physical interaction. In other embodiments, a random user instruction timer is generated, e.g., a countdown timer. When the random user instruction timer is exhausted or reaches zero, an instruction to perform the first physical interaction is generated, such as, for example, on a display screen. In some such embodiments, the random user instruction timer is generated using an entropy accumulated in a device generating the instruction.

Further aspects are directed to a system or systems for establishing, at least in part, secure communications between devices. At least one device includes a sensor for detecting physical phenomena, a transceiver for sending and receiving electronic communications, a storage memory, and a processor for executing computer-readable instructions, e.g., executing or running a computer program or app. The system may include a computer program or app that performs, or causes to perform (e.g., when executed), a method including detecting a first physical interaction between devices and storing in memory a timestamp of the first physical interaction (e.g., with a computer processor), and detecting a second physical interaction between the devices and storing that timestamp in memory. A first time value secret is then determined using, based on or derived from the timestamp of the first physical interaction and the timestamp of the second physical interaction. An encryption key may be generated using, based on, or derived from the first time value secret, and at least one encrypted validation message is encrypted using the encryption key. The encrypted validation message(s) is then transmitted by from one device to another (wirelessly or otherwise). In response, an encrypted confirmation message is received, and an attempt is made to decipher the encrypted message using the encryption key. If successful, the devices proceed to communication using the encryption key. In further embodiments, a set of encryption keys is generated. If the attempt to decipher the encrypted confirmation message fails using one of the keys in the set, further attempts are made using other keys in the set.

In some embodiments, a variant of the timestamp of the second physical interaction is calculated by adding or subtracting a unit of time to the timestamp of the second physical interaction. A second time value secret is then determined using, based on or derived from the timestamp of the first physical interaction and the variant timestamp of the second physical interaction. Next, a second encrypted key is generated using, based on, or derived from the second time value secret, and a second encrypted validation message (or messages) is encrypted using the second encryption key, and transmitted. If the attempt to decipher the encrypted confirmation message fails, an attempt to decrypt the message using the second encryption key is made. If this attempt is successful, the devices proceed to communicate using the second encryption key.

In a further embodiment, the first encryption key is generated using a key derivation function. In another embodiment, the first time value secret is determined using a difference between the timestamp of the first physical interaction and the timestamp of the second physical interaction. In a further embodiment, the first time value secret is rounded to a number of significant digits less than a response time of the sensor. In another embodiment, the first time value secret includes an entropy generated by a user during occurrence of one or more of the first physical interaction or the second physical interaction. In other embodiments, the sensor is an accelerometer, a microphone, a light sensor, a button, or an electromagnetic radiation sensor. In a further embodiment, the sensor is an accelerometer and the timestamp of the first physical interaction corresponds to a peak accelerometer reading during the first physical interaction.

In other embodiments, a random user instruction timer is generated, e.g., a countdown timer. When the random user instruction timer is exhausted or reaches zero, an instruction to perform the first physical interaction is generated, such as, for example, on a display screen. In some such embodiments, the random user instruction timer is generated using an entropy accumulated in a device generating the instruction.

At least some embodiments of the invention provide secure communication without exposing the communication to potential interception by third parties. At least some embodiments do so without electronically transmitting a key between devices. At least some embodiments utilize a shared-secret between devices. At least some embodiments establish secure communications in a manner in which it is difficult for third parties to observe, detect or determine the shared-secret. At least some embodiments of the invention provide greater security, with less risk of third-party infiltration, than previously-known security measures.

Other objects and advantages of the present invention should become apparent to those of ordinary skill in the art in view of the following detailed description of embodiments and the accompanying drawings.

BRIEF DESCRIPTION OF THE DRAWINGS

The foregoing features of the disclosure will be apparent from the following description, taken in connection with the accompanying drawings, in which.

DETAILED DESCRIPTION OF EMBODIMENTS OF THE INVENTION

Figure 1:
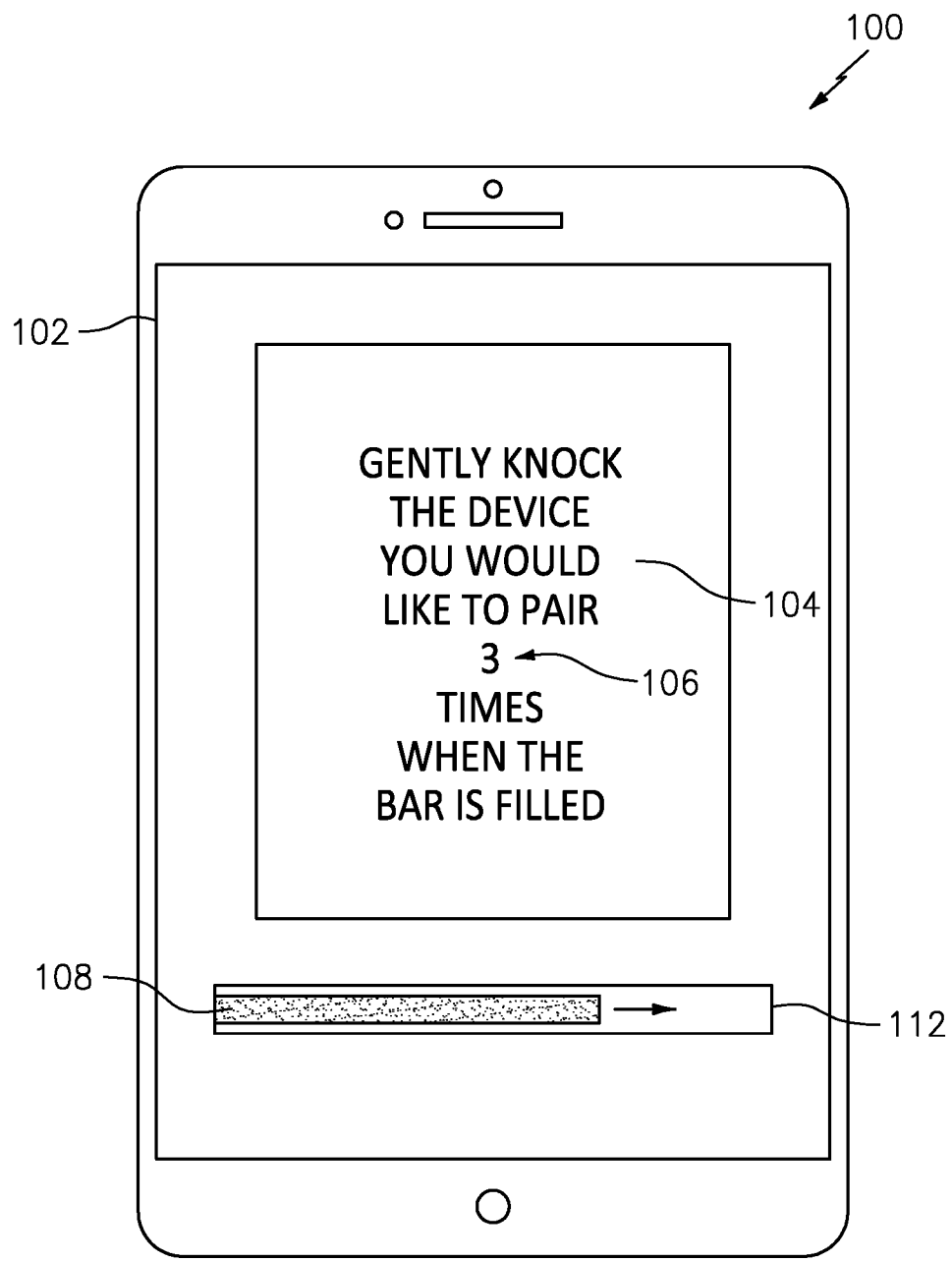
FIG. 1 is a schematic illustration of smartphone including a user interface for securely authenticating devices without server assistance or pre-shared credentials that may be utilized in certain embodiments of the invention.

The present invention provides systems and methods for enhanced communications security between electronic devices. In some embodiments, a shared secret between electronic devices is utilized. The shared secret may be in the form of a high-entropy shared secret (i.e., a sufficiently long binary string that is difficult to guess). The nature of entropy in secure communications and cryptography should be understood to those skilled in the art. In some embodiments, the entropy for the key (e.g., encryption key for encrypting communications) may be derived from one or more physical events. In some such embodiments, the one or more physical events involve unpredictable time secrets derived from actions of a human user, and may also be derived from communicating a collected entropy to the device by means of a physical event, for example, entropy collected from a handset/computer that has been running for a sufficiently long time to collect a cryptographically-sufficient entropy pool, as will be understood by those of ordinary skill in the art.

In some embodiments, a high-entropy and optionally short-lived shared secret is constructed to create an authenticated secure communication link that no third party can break into electronically. Using that shared secret, pairing between devices sharing the secret may then proceed in a usual manner as would be understood by those of ordinary skill in the art. The pairing may, in certain embodiments, involve exchanging one or more long-lived shared secrets and/or other credentials in known ways or ways that will become known in the future. Though such long-lived shared secret(s) or credentials may, depending on the embodiment, be susceptible to discovery by a third party (to varying degrees depending on the nature of the secrets or credentials, the devices sharing those secrets, and the mode of communication and protocol of the communication between devices), the presence and/or use of a secret that third parties cannot discover prevents third party access to the devices or communication therebetween. Exemplary embodiments of secure communications that may be used in accordance with embodiments of the present invention are discussed in U.S. patent application Ser. No. 14/728,867, filed Jun. 2, 2015, titled "Systems and Methods For Secure Communication Over a Network Using a Linking Address," which is incorporated herein by reference.

In certain embodiments, short-lived shared secrets may be used. They can be used as session keys to transmit other secrets or authenticated data (such as public keys). Once a shared secret is established, the secret can be used in many ways, or combination of ways, for example:
- to authenticate the device for the duration of the session ("short lived");
- to generate a session encryption key ("short-lived"), and then transmit other (short or long-lived) secrets through this session; and
- to do both of the above (in which case transmitted data is both private and authenticated).

In some embodiments, creating this secret includes both devices having counter-timers that run at approximately the same rate, for example, one tick every microsecond. The timers are, for example, started (from 0) at approximately the same time utilizing a first physical event performed by the user (or users) as a start signal, and then read again at approximately the same time as determined by a second physical event performed by the user(s). In some embodiments, at least one subsequent timer reading is made, at a time or times determined by further physical events performed by the user. The time(s) elapsed between these events (and thus the values read by both sides from their respective counter-timers) will vary depending on (1) when the user is instructed to perform an action, and (2) the time lapse between when the user is instructed to perform the action and when the user actually performs the action. The first item—the timing of instructions to the user—may be performed by a smartphone or computer, because it typically has a sufficient entropy pool (e.g., because it has been running for a long time before the session and has accumulated entropy). Other devices cannot guess this collected randomness. The second item—user reaction time and the time required to perform physical manipulation—is highly dependent on the individual, physics of hand movements, etc., at that particular lime.

In yet other embodiments, the procedure, for example, may consist of any combination of the following:
1. A user is instructed by the smartphone (for example, by flashing a sign on the screen, producing an audio notification, or producing a physical notification, for example, vibration, etc.), at random times, derived from entropy collected on the smartphone, to "knock" or contact the smartphone once against the target device each time the instruction is given.
2. A user is instructed to knock the smartphone against the device several times (the number of times can be specified by the relevant device, which may be randomly set by the device, or left to the user to decide), waiting a random time between knocks.

In such embodiments, the two devices detect the first physical contact event, which starts their respective counter-timers running, and then read their respective running counter-timers at subsequent physical contact events. The read values collected at subsequent physical contact events may then be used to create the shared secret.

FIG. 1 shows a schematic illustration of a user interface for securely authenticating devices without server assistance or pre-shared credentials. The smartphone 100 comprises an operating system including methods and libraries for presenting a user interface to a user on a display screen and receiving user input, as should be understood by those of ordinary skill in the art. The smartphone 100 presents an application in graphical user interface 102 to guide the user through the authentication process. The graphical user interface 102 displays user instructions 104 and a progress bar container 112 to signal the user of the moment that the user should begin physical interactions. The graphical user interface 102 illustrated presents an instruction 104 instructing the user to perform at least one physical interaction. In certain embodiments, the amount of physical interactions that the user is instructed to perform 106 is randomly generated based on accumulated entropy in the smartphone. In this embodiment, the user is instructed to cause the smartphone to physically contact (i.e., knock) the second device three times when the progress bar 108 fills the progress bar container 112. In other embodiments, a different number of "knocks" are performed, for example, fewer, e.g., 2, or more, e.g., 4. However, the invention is not limited to any particular number of knocks.

The progress bar 108 may gradually fill and when it is complete, the user begins the sequence of physical interactions. In some embodiments, the smartphone may create one or more additional stimuli when the progress bar container 112 becomes filled in order to prompt the user to perform the physical interaction, such as a screen flash, vibration and/or sound effect. In other embodiments, the user instruction may be provided without display on a graphical user interface, such as, for example, generating sound or light (e.g., synthesized speech, a beep, a light flash or flashes, etc.), vibration(s), or other suitable method, some of which are discussed further below. Such embodiments may be utilized, for example, when one or more of the devices do not include a display screen or graphical user interface.

The precise amount of time elapsed between the stimuli and the action is impossible to guess due to the inherent nature of the human body, attention and reaction time delay, which not only varies significantly from person to person, but also varies significantly from one time to another for an individual. Thus, the use of human interaction in the key generation process introduces a high level of cryptographic security. In some embodiments, the human interaction creates entropy that is used in the key generation process (e.g., performing the physical interaction). In certain embodiments, the timer rates may be chosen such that variance in human response to the stimuli is significant relative to the timer rate (e.g., timer rates in microseconds or milliseconds) so that the variance produces large timer readings at the scale of the timer. In most cases, it is effectively impossible for a human to repeatably execute a physical task at millisecond precision. Therefore, even in the absence of randomness in the user-instruction, the physical actions of the user introduce sufficient randomness for cryptographic security. Nevertheless, the addition of randomness or pseudo-randomness from a device's entropy pool to the user instruction adds unpredictability to the shared secret, at least by directing the user towards unpredictable action. It is generally known in the art that users may attempt to simplify authentication measures and thereby result to predictable practices (for example, setting a passcode to "1234" or "qwerty"). To the extent that user actions may become predictable, the user instruction ensures that users do not fall into predictable physical interaction patterns by prompting the user with stimuli at a randomly generated time and/or a random number of events, thereby causing the user's actions to be unpredictable to third parties.

Figure 2A:
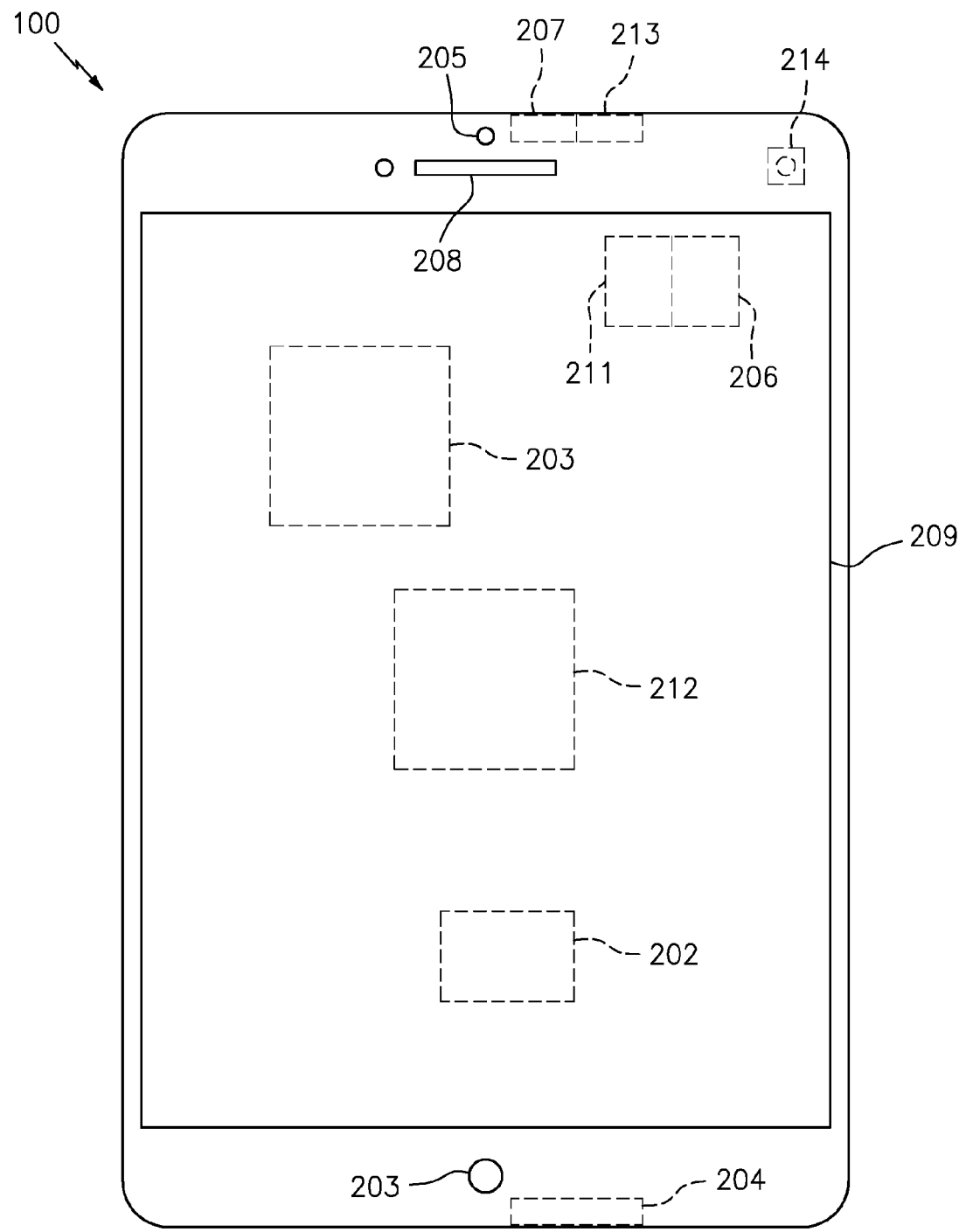
FIG. 2a is a schematic illustration of the internal components of the smartphone device of FIG. 1.

FIG. 2a schematically shows certain internal components of the smartphone device 100. Smartphones typically possess various sensors and signal emitters that can be used for creating or detecting physical interactions. The smartphone 100 has a processor 203 and memory (not shown) capable of executing program code to perform features of the present invention. The smartphone 100 includes an accelerometer 202, a physical button 203 (e.g., a mechanical push button, capacitive button, or resistive button), a microphone 204, a camera 205, an antenna 206, an infrared (IR) detector 207, a speaker 208, a display screens 209 (which contains user interface 102), a wireless transceiver 211, a haptic feedback motor 212, an IR emitter 213, and a light-emitting diode (LED) 214 (which often provide lights for a camera). The wireless transceiver 211 is configured for wireless transmission using various wireless communication technologies, including Bluetooth, Bluetooth Low Energy (BLE), Wi-Fi, a cellular communications network, and/or any other networks. Other embodiments include smartphones and computers with differing combinations and/or numbers of the above-discussed features, and/or other components suitable to producing and/or detecting physical interactions, either currently-known or later-developed. Furthermore, as will be apparent to one of ordinary skill in the art, the methods of the present invention may be applied to any shared secret communication between devices, including wired as well as wireless communications.

Figure 2B:
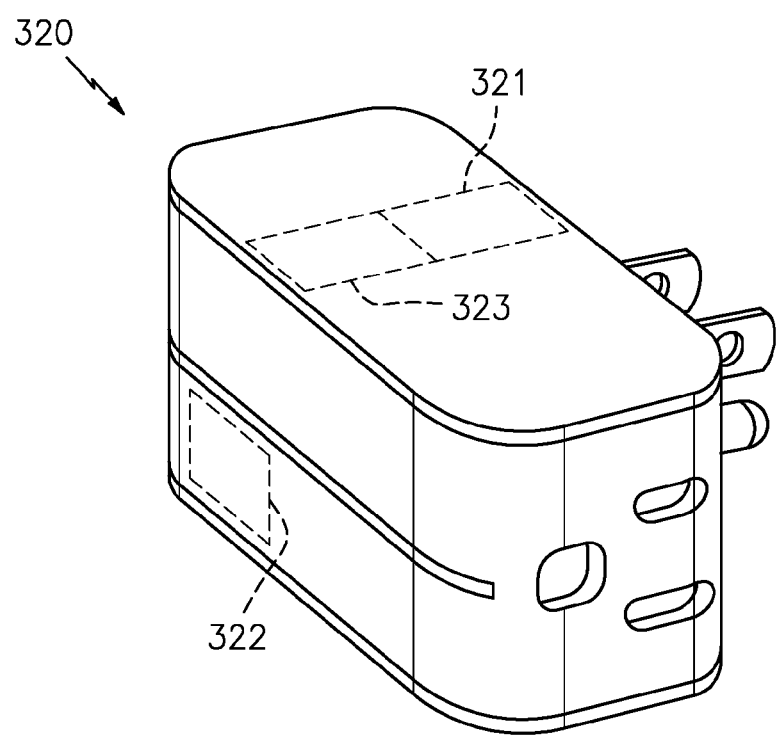
FIG. 2b is a schematic illustration of another device that may be utilized in certain embodiments of the invention.
Figure 2C:
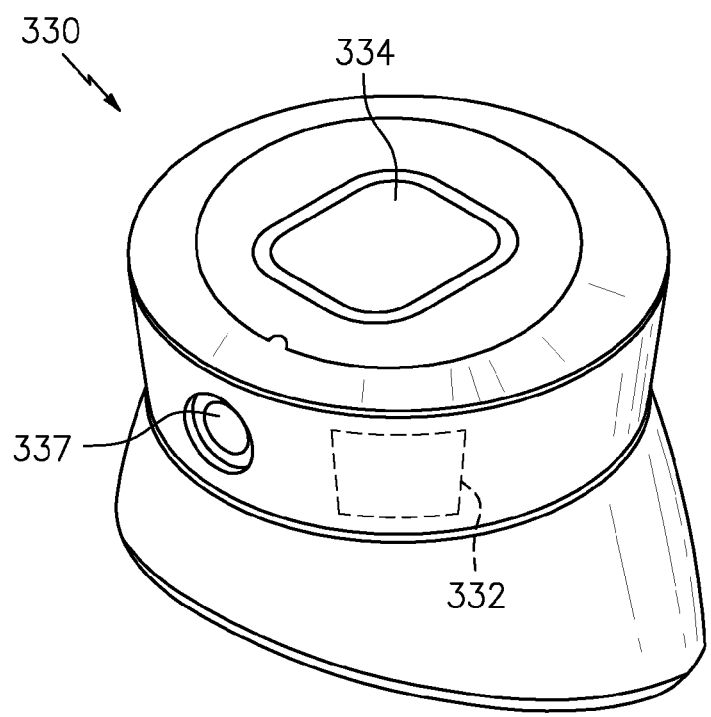
FIG. 2c is a schematic illustration of another device that may be utilized in certain embodiments of the invention.

FIGS. 2b and 2c are schematic illustrations of other devices that may be utilized in certain embodiments of the invention. The devices 320 and 330 are non-limiting examples of devices that may be capable of establishing secured communication according to the methods of the present disclosure. These devices may be "smart-enabled" devices comprising at least a processor and memory, a transceiver, and a component such as a sensor suitable to detecting physical interactions.

For example, the smart plug 320 comprises an accelerometer 321. The smart plug 320 further comprises a processor 322 and a wireless transceiver 323. The processor 322 has memory (not shown) and is capable of executing program code adapted to implement embodiments of the present invention. The wireless transceiver 323 is configured for wireless transmission using various wireless communication technologies, including Bluetooth, Bluetooth Low Energy (BLE), Wi-Fi, a cellular communications network, and/or any other network. Exemplary embodiments of smart plugs are disclosed in U.S. patent application Ser. No. 14/823,732, filed Aug. 11, 2015, titled "Multifunction Pass-Through Wall Power Plug With Communication Relay and Related Method," and U.S. patent application Ser. No. 14/988,590, filed Jan. 5, 2016, titled "IOT Communications Bridging Power Switch," which are incorporated by reference.

Smart thermometer 330 comprises an accelerometer 332, a pushbutton 334, and an IR detector 337, as well as a similar processor (not shown) and wireless transceiver (not shown) as described for smart plug 320. Exemplary embodiments of smart thermometers are disclosed in U.S. Pat. No. 8,931, 400, issued Jan. 13, 2015, titled "Remote Cooking Systems and Methods," which is incorporated by reference Devices in other embodiments may include other components suitable to detecting physical interactions, either currently-known or later-developed. They may further comprise other components suitable to producing physical interactions. However, such capability is not necessary to produce physical interactions in certain embodiments of the invention, as the user may perform the physical interaction on the devices.

Figure 3A:
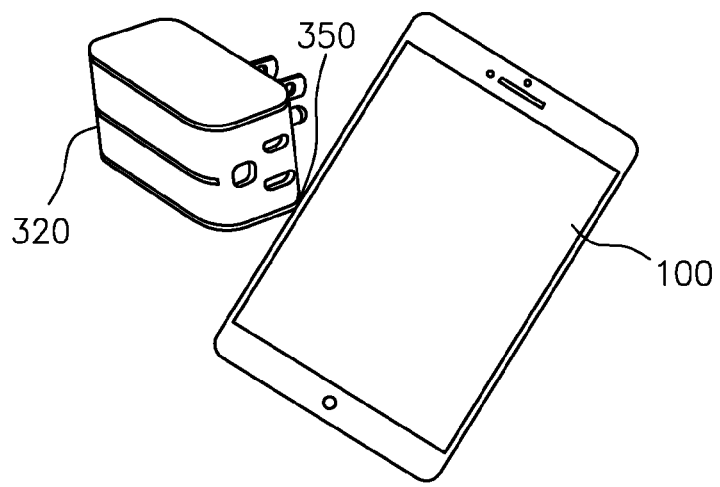
FIG. 3a is a schematic illustration of a physical action between a smartphone and a device that may be utilized in certain embodiments of the invention.
Figure 3B:
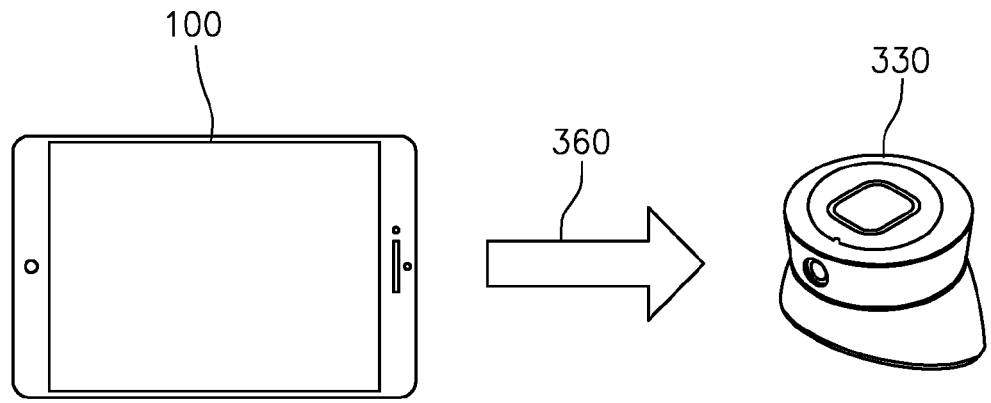
FIG. 3b is schematic illustration of the occurrence of another physical action between a smart phone and a device that may be utilized in certain embodiments of the invention.
Figure 3C:
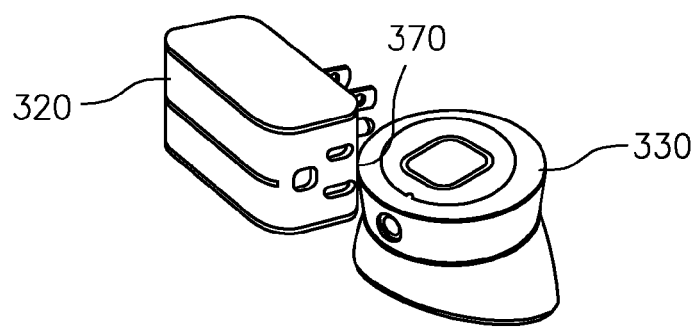
FIG. 3c is a schematic illustration of a physical action between devices that may be utilized in certain embodiments of the invention.

FIGS. 3a-3c schematically show exemplary physical interactions according to embodiments of the present invention involving combinations of the smartphone 100, the smart plug 320, and the smart thermometer 330. In certain embodiments, the physical interaction is performed between devices (e.g., smartphone/computer and the target device, a first device and a second device, etc.). In such embodiments, the involved devices are configured so as to have the capability to detect such physical action. For example, the device may have one or more pushbuttons, accelerometers, light sensors, sound sensors, and/or any other mechanisms suitable to detect physical interaction, either currently-known or later developed. An example of a device that may have such components is a present-day smartphone such as smartphone 100, or a smart device such as smart plug 320 or smart thermometer 330.

FIG. 3a is a schematic representation of an embodiment of a physical interaction between the smartphone 100 and the smart plug 320. FIG. 3a illustrates a physical contact interaction (i.e., knocking), but in other embodiments the physical interaction is a different physical interaction. In the illustrated embodiment, the smartphone 100 has been knocked against the smart plug 320, and the devices have physically touched at contact point 350. In this embodiment, both devices have accelerometers. The physical actions, e.g., a user gently "knocking" the devices 100, 320 together to create multiple accelerations (or decelerations) of the devices 100, 320, are detected by the devices' respective accelerometers. Software on each device is configured to detect and process an acceleration/deceleration signal or "spike" from the accelerometers, and therefore substantially simultaneously detect the respective spikes generated by the contact of the devices 100, 320.

Other embodiments utilize the button 203 of the smartphone 100 (or other first device), and the accelerometer 321 of the smart plug 320 (or other second device). In such embodiments, a user may "knock" the button 203 on the first device 100 against the second device multiple times. The physical interaction, accordingly, includes the activation of the button 203 on the first device 100 and the detection and processing of the acceleration/deceleration of the second device 320. In further embodiments, both involved devices have protruding pushbuttons, and the physical interaction comprises a user contacting or pushing the devices together multiple times, pushbutton against pushbutton, so that both pushbuttons are activated by the contact. In another embodiment, each device has a pushbutton, and the user presses both buttons simultaneously multiple times. In other embodiments, the detection of physical interaction may be by one or more of pushbutton(s) (e.g., the button 203 of smartphone 100 or the pushbutton 334 of the smart thermometer 330), accelerometer(s) (e.g., the accelerometer 202 of the smartphone 100, accelerometer 321 of the smart plug 320, or accelerometer 332 of the smart thermometer 330), light detector(s) (e.g., the camera 205 or IR detector 207 of the smartphone 100, or the IR detector 337 of the smart thermometer 330), microphone(s) (e.g., the microphone 204 of the smartphone 100), or any other sensor disposed to detection of physical events. These methods of detection will be further discussed in reference to FIG. 3b, below.

Referring now to FIG. 3b, the physical interaction method comprises an IR light 360 emitted by the IR emitter 213 of the smartphone 100 and received and detected by the IR sensor 337 of the smart thermometer 330. In other embodiments, the physical phenomena emitted by the smartphone 100 may be a physical phenomena other than IR light 360 that can be emitted by the smartphone 100 (or other device) and detected by a target device, including, for example, all forms of electromagnetic (EM) radiation (e.g., IR light, ultraviolet light, visible light, radio waves, etc.) and sound. Alternatively, the user of the device may generate the physical phenomena, for example, by clapping or shouting.

In certain embodiments, each device associates the same timing with the physical interactions—whether the smartphone produces the physical interaction or the user does. For example, in embodiments where the user generates the physical interaction, for example, by knocking the devices together or clapping, the timing of the physical interaction is detected by sensors (e.g., accelerometers or microphones) on both devices. In other embodiments, where the smartphone generates the physical interaction, for example, by flashing lights, the timing of the light flashes from the smartphone and the corresponding detection of the light flashes in the target devices enables generation of the shared secret. In certain embodiments, physical interactions may be produced by the smartphone 100 by itself. For example, in some such embodiments, the smartphone randomly generates the pattern of light that is produced based on accumulated entropy (which provides randomness or at least pseudo-randomness). Such random physical interaction can take various forms, including repeated events, event patterns, periods of on and off state, or physical interaction of varying intensity (e.g., light of varying intensity, sound of varying tones or intensity, or accelerometers being shaken together randomly or according to a pattern). In an alternative embodiment, the smartphone may instruct the user to turn on and off a light, such instruction being previously discussed, thereby contributing human unpredictability to the shared secret generation. The use of light or sound presents a different risk profile of a third-party being able to successfully capture the physical interactions compared to physical contact, because production of light and sound may be observable by different means and distances than physical contact.

As one skilled in the art should appreciate, the risk of third-party observation for a particular physical interaction may be considered in view of the ease or convenience of use of that physical interaction and the circumstances in which it may be used, for example, the environments or locations in which the physical interactions are expected to occur, the potential damage that may occur if communication is compromised, and other factors as should be appreciated by those or ordinary skill in the art. Thus, a particular physical interaction or interactions used to establish secure communications can be selected to minimize the risk of third-party observation or detection for a particular situation, as will be further discussed below.

FIG. 3c schematically shows a physical interaction between two devices not including a smartphone. In the illustrated embodiment, the smart plug 320 has been knocked against the smart thermometer 330, and the devices have physically touched at contact point 370. In this embodiment, the accelerometer 321 of the smart plug 320 and the accelerometer 332 of the smart thermometer 330 detect the contact of the devices 320, 330. The time(s) of physical interaction(s) are read or recorded by the devices 320, 330. These times are then used to generate the key to be used for shared secret communications, as discussed further below. In the illustrated embodiment, a user "knocks" the smart plug 320 and the smart thermometer 330 together multiple times. In some embodiments, the user initiates a device pairing mode on either or both devices prior to the physical interaction (e.g., by pressing a button), so that the devices are ready to detect and utilize the physical interaction.

As illustrated in the embodiment shown in FIG. 3c, the present invention is not limited to pairing between a smartphone and another device, and can be with devices lacking display or feedback capabilities (such as haptic motors, LEDs, speakers, or any mechanism for providing feedback to the user). As discussed previously, human actions are generally sufficiently random and/or unpredictable at the precision of the timer-counters, for example, at millisecond precision, to provide a secure connection. Although these devices may lack display or feedback capabilities necessary to present instructions to the user at random times or with random amounts of physical interactions, a user may still establish secure communications between these devices by attempting to randomly cause physical interaction between the two devices (e.g., by randomly choosing the number of interactions and/or timing of the interactions, such as randomly knocking them together several times). Moreover, the typical randomness of human action compared to the precision of the timer-counters may provide sufficient randomness even when the user attempts to cause the physical interaction in a non-random or patterned matter. Furthermore, in some embodiments, devices lacking a display but still having some capability to provide feedback to the user may provide prescribed user instruction to execute the physical interactions by, for example, vibrating, emitting a sound, flashing a light, or any other method, thereby providing a random stimulus to the user and increasing cryptographic security.

In the previous non-limiting examples, the moment of the physical contact determines either the starting of the timer-counters of the devices or subsequent reading of such timer-counters. In certain embodiments, the two devices' timers run at approximately the same rate. Because the two devices simultaneously start, and then simultaneously read their respective timer-counters, the devices produce the same readings. In certain embodiments, these readings are used to create the shared secret. As these readings have been created by random behavior just at the time of pairing and not externally communicated/transmitted by the devices making the reading, no other party has had access to them. Thus, as previously discussed, the readings are resistant to observation or guessing by third parties. In some embodiments, the timers may run at different rates, and the rate differences are corrected by the respective key generation process on each device, as discussed below.

Figure 4A:
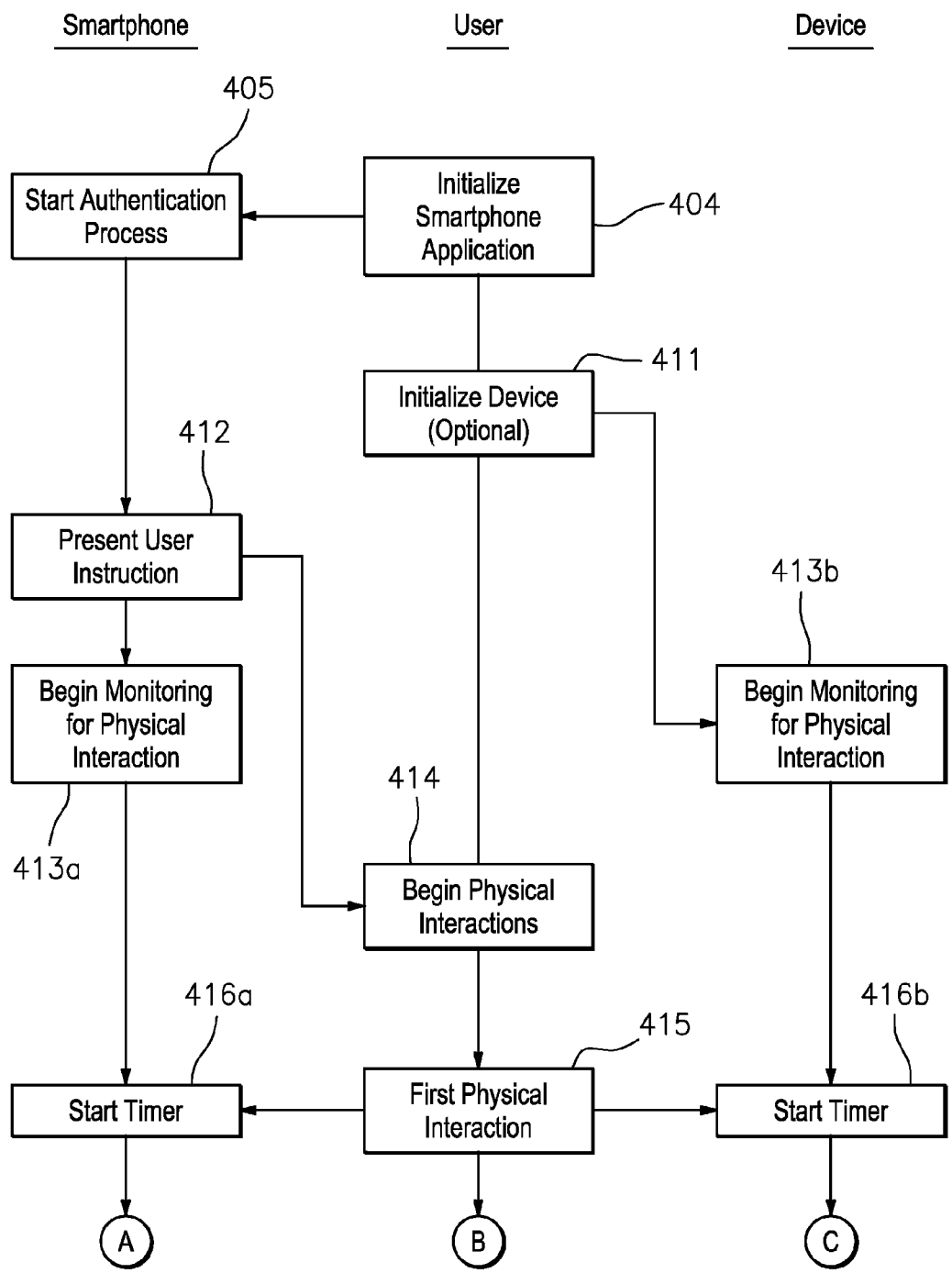
FIG. 4a is a block diagram showing an exemplary embodiment of steps taken to securely authenticate devices.
Figure 4B:
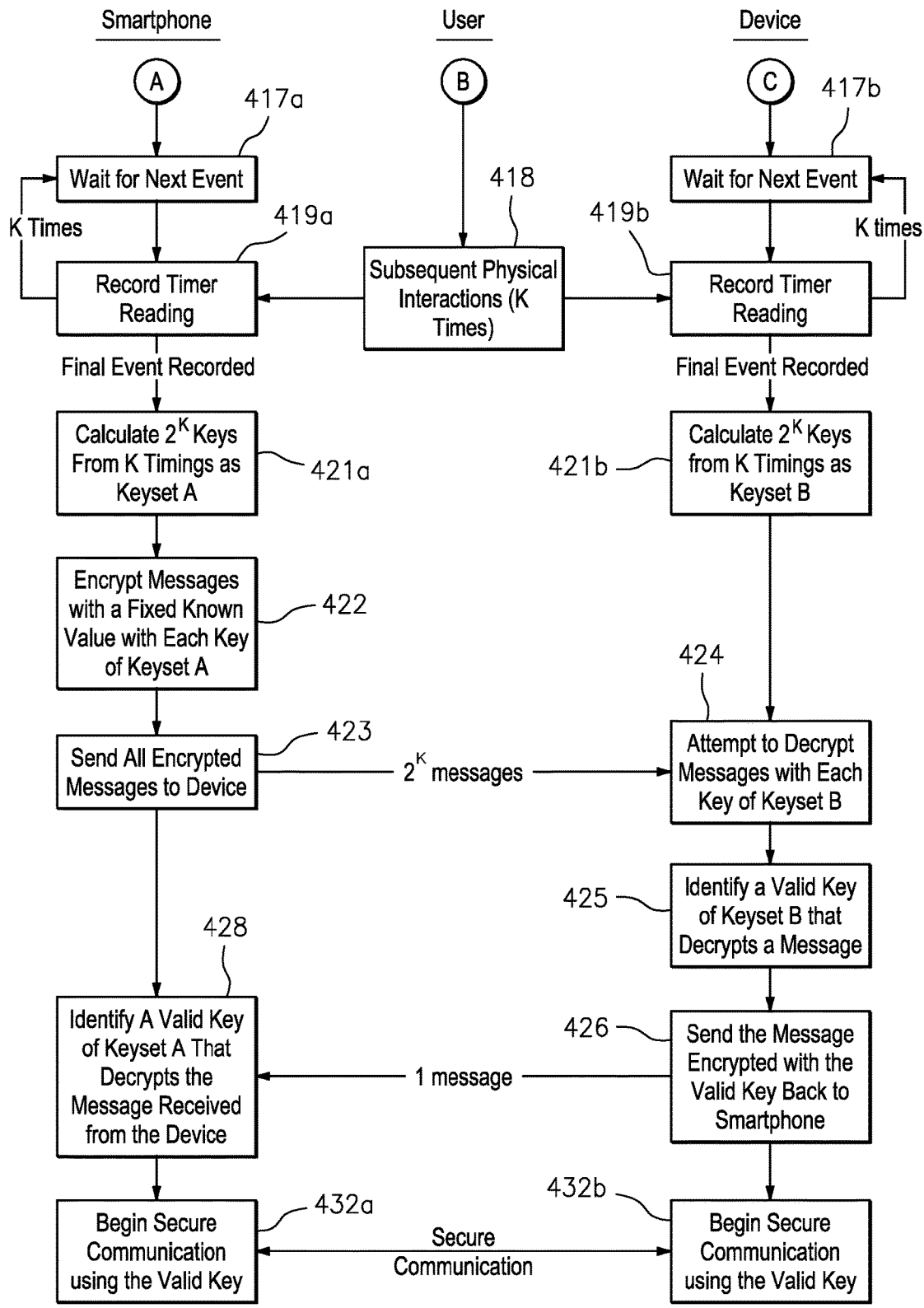
FIG. 4b is a continuation of the block diagram of FIG. 4a showing an exemplary embodiment of steps taken to securely authenticate devices.

FIGS. 4a-4b are a block diagram showing an exemplary embodiment of securely authenticating devices. FIGS. 4a-4b include exemplary steps according to an embodiment that establishes secure communication between devices. The flowchart is arranged into vertical columns showing actions or steps taken by, from left to right in the figure, a smartphone, a user, and another device. Although the steps as shown approximate a temporal order of steps, it should be clear to one of ordinary skill in the art that certain steps may be rearranged, modified, or omitted according to the particular embodiment of the present disclosure that is practiced. Further, another type of device may be used instead of a smartphone.

At step 404, a user initializes an application in the smartphone to begin the secure authentication process. In certain embodiments, the user interacts with an application configured for the secure authentication process, e.g., by selecting a user interface button of the application (e.g., a virtual button on a graphical user interface of the smart phone) that begins the secure authentication process on the smartphone. Upon the user request, the smartphone begins the authentication process (step 405). In certain embodiments, at step 411, the user further initializes the device to begin the secure authentication process by interacting physically or electronically with the device (e.g., by pressing a "pair" pushbutton, such as button 334 of the smart thermometer 330 in embodiments using such a thermometer, or by any other suitable method as would be understood by those ordinary skill in the art). In other embodiments, the device is always or periodically monitoring for the secure authentication process and the user need not interact with the device other than by performing the physical interaction events required by the authentication process.

The smartphone application may optionally include an instruction to the user to proceed with a first physical interaction event at step 412. In certain embodiments, the smartphone accumulates an entropy pool as is understood by those of ordinary skill in the art, for example, by normal use of the smart phone. The smartphone application may use the entropy pool of the smartphone in order to randomly generate user instructions to proceed with the physical interaction events by executing a system call that returns a random value in a manner that should be known to persons of ordinary skill in the art. In some embodiments, after initializing the secure authentication process at step 405, the smartphone randomly or pseudo-randomly generates a count-down timer (e.g., in the range of seconds) in a manner that would be understood by those of ordinary skill in the art. When the count-down timer reaches zero, the user is prompted to begin the physical interaction events by a stimulus, e.g., such as previously discussed. In some embodiments, the user is instructed to cause physical interaction events with the two devices a pre-determined number of times. In other embodiments, the user is instructed to cause physical interaction events with the two devices a random number of times generated by the smartphone application in a manner that would be understood by those of ordinary skill in the art. In some embodiments, the user is instructed to cause physical interaction events with the two devices a random number of times selected by the user.

In other embodiments, the user is instructed to cause physical interaction events by executing or repeating a randomly-generated rhythm or pattern of physical interaction events. In some embodiments, the smartphone randomly generates a pattern that the user is instructed to repeat by physical interaction events. The pattern may be communicated to the user by several methods, including visually (e.g., via a graphical user interface of the smartphone), aurally, haptically, or by any other suitable method as would be appreciated by those in the art. In order to be resistant to third-party snooping, the method of communication of the pattern may be selected to reduce the risk of third-party observation. For example, a pattern communicated to the user by vibration of a haptic feedback motor of the smartphone to the user's hand may be difficult to detect by a third-party observer at a distance from the interaction. On the other hand, in a reasonably secure or closed (to third-parties) environment, such as a user's home or office, the risk of detection of an audio pattern may be low.

Once the smartphone has been initialized (and, if the device requires initialization, once the device has been initialized), both devices are configured to wait for detection of the first physical interaction event (steps 413a, 413b). In certain embodiments, a first physical interaction event by the user at step 414 initiates a timer at or to zero seconds or starts a timer running (e.g., a time that was not running prior to the physical interaction) on both devices (steps 416a, 416b). The device may create a timestamp comprising or representing the reading or value of the timer at the time of a particular event, such as a physical interaction event. In other embodiments, timestamps are determined using a system time or some other time tracked by the device, for example, approximately synchronized system times on both devices. In certain embodiments, system times may be synchronized amongst devices in any suitable manner, which should be understood by one of ordinary skill in the art, e.g., by a user (or users) of the devices, the devices connecting to the same time server to set their system times (for example, NIST time service), or to separate time servers that are approximately synchronized (for example, cellular service time servers), etc. In some such embodiments, a separate timer is not needed because the system time of the first physical interaction event is recorded as a timestamp (e.g., at t=0 seconds, or at t=Tue, 8 Aug. 2017 17:09:46 GMT, or at t=1502212230092 ms since Jan. 1 1970 UTC). In certain embodiments thereof, it is the elapsed time between the first physical interaction event and subsequent physical interaction events that is used to generate the key. Accordingly, the particular or absolute value of the timestamp of the first physical interaction is not relevant or necessary.

Both devices proceed to monitor for further physical interactions (steps 417a, 417b) and at step 418, the user executes subsequent physical interaction(s) (for example, a variable number of K physical interactions, as previously discussed). At steps 419a and 419b, each device records a timestamp at the moment of a subsequent physical interaction event. In certain embodiments, a subsequent physical interaction may be the same method of physical interaction as the first physical interaction (e.g., pushing a button). In other embodiments, it is a different method of physical interaction (e.g., knocking). The second recording may be in the same time scale as the first recording (e.g., at t=0.004 seconds, or at t=Tue, 8 Aug. 2017 17:09:46.004 GMT, or at t=1502212230096 ms since Jan. 1 1970 UTC), though as noted earlier, the devices need not necessarily have identical precision or time scales. In some embodiments, the second recording, and any subsequent recordings of timestamps are in reference to a timer that was started at the first physical interaction.

In yet other embodiments, the second physical interaction (for which a timestamp corresponding thereto is read/recorded) results in the timer being reset or stopped. Upon occurrence of a subsequent physical interaction, the timer starts running (e.g., again), and, upon yet a further physical interaction, a timestamp is read/recorded relative to the restarted timer. This cycle can be further repeated if desired.

As will be discussed further below, in certain embodiments, the relative time between timestamps may be used to establish the shared secret. In embodiments where the number K of physical interaction events is pre-determined, each of the smartphone and the device return to steps 417a and 417b to wait until the pre-determined number of physical interaction events have been recorded. In embodiments where the number of physical events is not pre-determined, the smartphone and the device may continue to wait for a threshold period of time for further physical interaction events before proceeding to key generation. In embodiments where the number of physical events is randomly (or pseudo-randomly) generated by the smartphone, the smartphone continues to monitor for physical interaction events until that number of events are recorded, while the device may continue to wait a threshold period of time to ensure that any further physical events are recorded. In certain embodiments, either or both of the devices continue to detect and record physical interaction events while proceeding to attempt shared secret generation and validation steps. It should be noted that the physical interaction events may be any of the physical interaction events described herein, or other physical interaction events that are currently-known or later developed.

When sufficient physical interaction event data has been recorded, the devices continue to steps 421a and 421b and each device generates variants of the recorded times from the set of recorded physical interaction event timestamps, for example, by adding or subtracting a unit of precision (e.g., one millisecond), that will be used in attempt to establish secure communications between the devices. In certain embodiments, the set of recorded physical interaction event timestamps are used to generate a table of several variants of the recorded times that will be used in attempt to establish secure communications between the devices, as will be discussed below. In the embodiments discussed below, the timestamps will be discussed in relation to three physical interaction events, and key generation will be discussed based on relative time between the timestamps. However, it should be apparent to one or ordinary skill in the art that the methods described may be applied to more complex event patterns, or even physical events with varying intensities, or may be based on the timestamps themselves rather than the difference in time between timestamps.

In certain embodiments, the counter-timers in the separate devices may not run at exactly the same speed, and there may be some variation in the observance, detection and/or processing by each device of the pushbutton activation, accelerometer spikes, or other action detection mechanism utilized. Those of ordinary skill in the art should understand how to compensate for such variances so as to, for the factors involved, and the physical and electronic processes involved, provide identical or corresponding readouts by the involved devices. In some embodiments, the variances may be addressed by suitable numerical rounding or truncation of readings or outputs. In some embodiments, to correct for a lack of synchronization between timers on the devices (absolute synchronicity may not be achievable), a rounding time unit is selected. In certain embodiments, the rounding time unit is selected to be greater than the precision of the timers. Accordingly, the measured time is rounded to the upper or the lower value of said rounding unit. Thus, the timers will yield at least one same (or equivalent) value amongst the devices, as will be discussed further below.

Some embodiments utilize real value error correction (e.g. codes) for timestamp "matching" or alignment as should be understood by those of ordinary skill in the art, including, but not limited to, for example, convex-relation decoding, Bayesian Approximate Message-Passing (AMP), as discussed in Barbier et al., "Robust error correction for real-valued signals via message-passing decoding and spatial coupling," IEEE Information Theory Workshop (ITW 2013), pp. 1-5 (2013), which is incorporated by reference herein, etc. As an illustrative example, if the errors of each timestamp are −1, 0, +1, then a base 3 error correction code might be utilized to "correct" the errors and create a "match." In some such embodiments, one device may calculate the error correction code, and the other device(s) would use the error correction code for correction or adjustment, e.g. respective timestamps or time value secrets.

Figure 5:
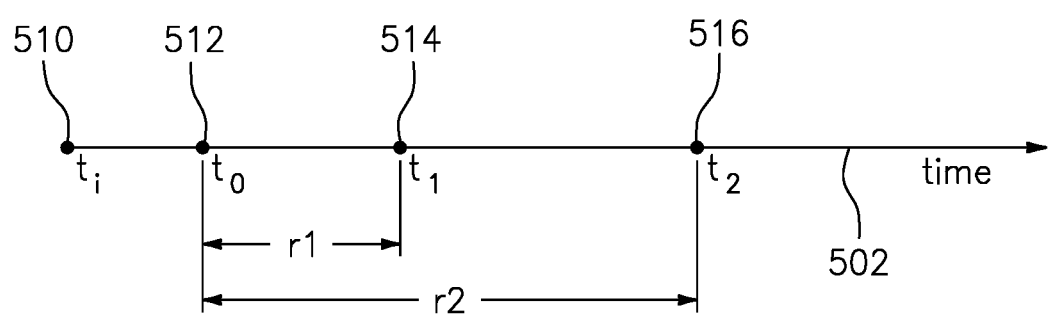
FIG. 5 is a schematic illustration of a plot of physical interaction events against time.

Referring now to FIG. 5, a schematic illustration of a plot 500 of a set of physical interactions against a time scale is shown. The axis 502 represents time, and in this example is in microsecond precision. In certain embodiments, the scale begins at an initialization time 510 at ti, as the devices begin waiting for the first event. In other embodiments, either or both devices may constantly monitor for physical interaction events. The illustration depicts an example of physical interaction events including three (3) knocks (one to start the counter-timers and the other two to read them) that occur at t0, t0 and t2 and accordingly provide two values r1 and r2. More specifically, a first event 512 is observed at t0 (for example, a first physical contact) and corresponds to the physical contact of the two devices. A second event 514 is observed at t1 (a subsequent physical contact), and a third event 516 at t2 (a subsequent physical contact). A processor in each device is configured to calculate a time value secret or time secret (e.g., a difference in time) between each of the events. In the illustrated example, these time value secrets are calculated as r1=t1−t0, and r2=t2−t0, although various other ways of representing the time value secrets of physical interaction events are contemplated by the invention, examples of which have been discussed herein. For example, the three timestamps t0, t1, and t2 may be used instead of determining the difference between timestamps.

As each device comprises a separate processor with separate timing mechanisms, the timestamps and/or r1 and r2 may be slightly different on each device. Moreover, although both devices may have similar sensors, the amount of time for each sensor to report activity to a processor may vary. Such variance between time value secrets (or time secrets) is accommodated by creating a set of keys, with each of the keys generated based on rounded or truncated values for the time value secrets. For example, a time value secret of 0.050500 milliseconds rounded to microsecond precision with variance correction may result in both 0.050 and 0.051 being used to create keys. In some embodiments, rounding or truncation is sufficient to determine the appropriate values to input to a Key Derivation Function (KDF) and generate the keys, and multiple solutions need not be tried. In some embodiments, a KDF takes some input (e.g., the time value secrets) and generates a longer, more secure secret (i.e., key-stretching). Methods of implementing key derivation functions in embodiments of the present invention should be known to persons of ordinary skill in the art.

In certain embodiments, physical interactions caused by the user(s) of the device possess an inherent randomness due to the nature of the human body or mechanics. In some embodiments, this inherent randomness generates entropy. In some such embodiments, this entropy is collected or incorporated into the time value secret(s) thereby providing cryptographic security, as should be understood by those of ordinary skill in the art.

Figure 6:
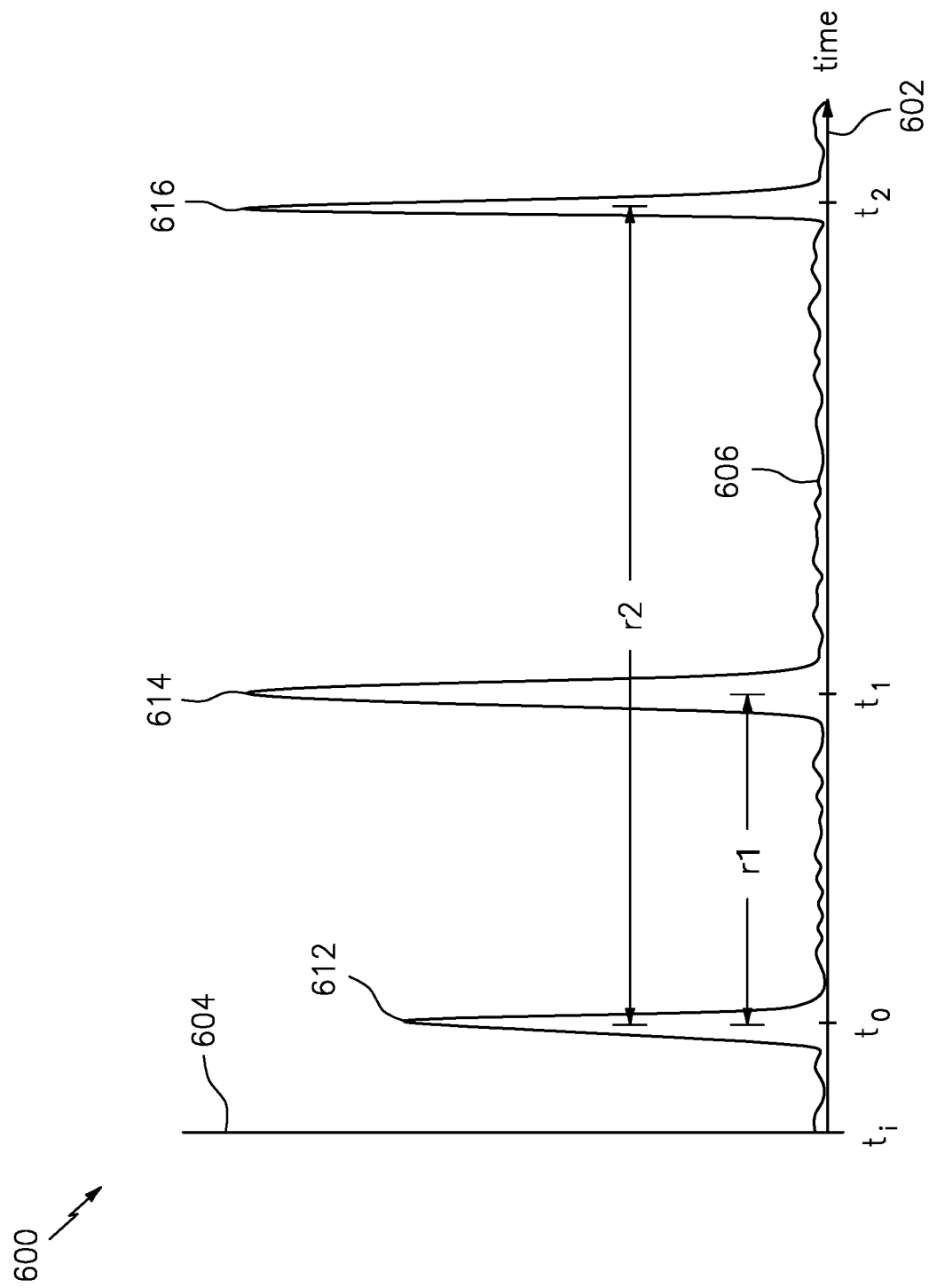
FIG. 6 is a schematic illustration of a plot of detection amplitude against time.

FIG. 6 shows a schematic illustration of a plot of accelerometer readings against time of the events depicted in FIG. 5. As shown, the accelerometer detects acceleration variation from a stable, near stable, off, or zero position. The plot 600 has a horizontal axis 602 representing time, in this case, microseconds, and the vertical axis 604 represents a magnitude 606 of activity detected by the sensor (in this case, displacement of the accelerometer). The local maxima (i.e., spikes or peaks) of the accelerometer readings correspond to the physical contact between the devices, which in the illustrated embodiment occurs at times (or time relative to ti) t0, t1 and t2. The scale of the horizontal axis corresponds to time at which the accelerometer readings are sampled. As shown, the first local maximum 612 corresponds to the first physical interaction event 512 described in reference to FIG. 5 at time t1. The second and third local maxima 614 and 616 correspond to the second and third physical contacts 514, 516 at times t1, t2. The schematic illustration applies to the smartphone and/or the device. Although the particular readings on either device may vary, the local maxima may be presumed to be at approximately the same time on both devices. Variance between devices may be accounted for as discussed below. It should also be noted that, while in FIG. 6 the acceleration is depicted as a positive acceleration reading, the reading(s) may be in either the positive or the negative direction.

In other embodiments, the particular physical interaction(s) used for authentication do not generate peaks in the sensor readings, but rather periods of time corresponding to a physical interaction (e.g., the period(s) a light is blinked on and off several times). In some such embodiments, the time value secrets may be calculated based on the center of each period detected/sensed that the physical interaction event occurred, the beginning of each period that the physical interaction event occurred, the end of each period that the physical interaction occurred, or any other reading from or characteristic of the physical interaction event that produces time value secrets that can be used to establish a shared secret, subject to possible adjustment for variance between devices.

Referring back to FIG. 4, at steps 421a and 421b each device calculates $V^k$ keys from the time value secrets r1 and r2, where V is the number of variants to be attempted (2, in the illustrated example) and K is the number of time value secrets (in this example, 2). The exact way of combining these time value secrets into shared secrets may take different forms, depending on various factors as should be appreciated by one of ordinary skill in the art. In one example, these values (e.g., r1, r2) are rounded to allow for differences in counter-timer frequencies and differences in readout/reporting delays among devices. The multiple readings are then combined in an entropy-preserving way, for example, by bitwise XORing of the byte-representations of r1 and r2, and then feeding the result through an appropriate KDF. If, for example, there are two readings as depicted in the example of FIG. 5 (3 knocks: one to start and the other two to read), then there are four possible combinations, and all may be used to generate keys. In certain embodiments, the variants used to generate keys for each of the time value secrets (or time secrets) are the rounded time value secrets and one unit of precision above or below the rounded unit (e.g., 1 millisecond above or below the time value secret). In other embodiments, the amount of variants used to generate keys may be expanded further than one unit of precision (e.g., up to several milliseconds above or below the time value secret) if desired, in a manner as would be understood by those of ordinary skill in the art. Such embodiments may be utilized, for example, if variance between the time value secrets of each device is larger than one unit of precision, so as to increase the probability of the devices generating a shared secret. However, the mathematical relationship just described with respect to the number of variants used to generate keys implies that using more variants may require greater computing resources to generate and validate than using fewer variants . . . Accordingly, the time value secrets may be rounded to be less precise, thus reducing the need to use variants to generate keys. For example, if two devices have a variance of up to one second, a minimum of 1,000 variants would be needed at millisecond precision, and 1,000,000 variants would be needed at microsecond precision. Thus, it may be computationally efficient to round from microsecond to millisecond precision. Therefore, the degree of rounding, and thus amount of variants that will be used to generate keys, will affect the computational cost of key generation and validation.

As discussed previously, third parties may attempt to access these devices. Video recording equipment may be used to attempt observation of a physical contact between the devices. However, any attempt to observe the physical interactions must be performed with a sensor capable of detecting the physical interaction at a precision that exceeds the precision of the timer of the device or the rate of the sensor of the device (whichever is less precise). Without such, a third party would have a high degree of difficulty in accurately observing the physical interaction and thus determining the time value secret (or time secret). For example, one embodiment of the present invention detects physical contact (e.g., knocking) of the devices at millisecond precision (1000 Hz) using an accelerometer. According to the Nyquist sampling theorem, if a third party attempts to detect physical interaction of devices operating at millisecond precision using video equipment, the equipment would need to sample video at double that rate (2000 Hz or frames per second). Because the rate of detection of the physical contact by the devices (1000 Hz) greatly exceeds the capabilities of most readily-available video detection mechanisms (typical high-end commercial cameras capture video only in the range of 200 Hz or frames per second), observing the physical interactions to determine the time value secret would require substantial effort and specialized equipment beyond the means of most third parties. In addition, extant cameras capable of detecting at such a high sampling rate typically would nonetheless require precise or close placement and stabilization means, such that any attempt to observe the physical contact may be conspicuous to the user. Even if camera technology progresses to higher sampling rates, security can be maintained by sampling the sensor at a greater time precision than the detection capability of available cameras. For example, a timer rate of microsecond precision (1,000,000 Hz) would provide security for video sensors operating at up to 2,000,000 Hz per the Nyquist theorem. In some such embodiments, increases in precision may be accomplished by a software update to the device(s), as should be understood by those of ordinary skill in the art.

Accordingly, the shared secret used in various embodiments of the invention is much more resistant to attack than traditional methods of exchanging shared secrets due to the difficulties in observing the physical interaction(s) between two devices. In addition, further security may be provided by restricting the number of keys that may be used in an attempt to establish secure communications (thus lowering the probability of finding a valid key without the shared secret), restricting the period of time available to validate a shared secret (thus lowering the probability that a valid key will be found before timeout), or other methods of resisting "brute force" attacks, as known to those skilled in the art.

Table 1 presents an example of a variance correction table consistent with an embodiment of the present disclosure.

TABLE 1

|  | Smartphone 410 | Device 410 |
| --- | --- | --- |
| Measured r1 (milliseconds) | 1233230 | 1234091 |
| Measured r2 (milliseconds) | 2711710 | 2710221 |
| Rounded r1 values (microseconds) | 1233, 1234 | 1234, 1235 |
| Rounded r2 values (microseconds) | 2711, 2712 | 2710, 2711 |

Each of the rounded values of Table 1 is then used to construct a set of keys to attempt secured communication between the devices. According to the previous discussion, this causes each device to generate $2^{2=4}$ keys based on each combination of the variance-corrected time value secrets. Table 2 presents an example of time value secret (or time secret) combinations that are inputted to a KDF to obtain shared secrets for secured communication consistent with an embodiment of the present disclosure.

TABLE 2

|  | Smartphone 510 | Device 520 |
| --- | --- | --- |
| Combination 1 | 1233, 2711 | 1234, 2710 |
| Combination 2 | 1234, 2711 | 1235, 2710 |
| Combination 3 | 1233, 2712 | 1234, 2711 |
| Combination 4 | 1234, 2712 | 1235, 2711 |

The smartphone and device then derive keys using equivalent KDF functions (e.g., equivalent functions are programmed into each device) based on the combinations, and attempt to establish secured communication using the resulting keys. The devices may verify that they have established communications by exchange of a magic word or by any other suitable method, as will be appreciated by those of ordinary skill in the art. Once a valid key has been found (as discussed further below), the devices may continue to communicate using the securely-generated shared secret. For reference, the keys generated from the time value secrets calculated by the smartphone are referred to as Keyset A, while the keys generated from the time value secrets calculated by the device are referred to as Keyset B.

In the illustrated embodiment, smartphone combination 2 matches to device combination 3. Accordingly, the key(s) generated by the smartphone and the device using the respective matching combination(s) will match between devices. At step 422, the smartphone encrypts messages to be sent to the device using each of the four keys it derived at step 421*a* (Keyset A). The smartphone then sends all of the encrypted messages (i.e., encrypted with different keys) to the device (step 423). At step 424, the device receives these messages and attempts to decrypt them with the keys that it derived at step 421*b* (Keyset B). At step 425, the device identifies the key(s) (the only key, in this example) that successfully decrypted at least one of the messages, in this case the key that was derived by the device from combination 3 (Keyset B). At step 426, the device sends the message that was successfully decrypted back to smartphone in its encrypted form (or re-encrypts the message using the successful key). At step 428, smartphone attempts to decrypt the message with each of the four keys it derived at step 421*a* (Keyset A). A key that decrypts the message becomes the shared secret for communication between the devices, which in this example, is the key that the smartphone derived from combination 2 (Keyset A) (or conversely, the key the device derived from combination 3 (Keyset B). At steps 432*a* and 432*b*, now that both devices have identified the same shared secret, they continue to securely communicate in any way that shared secret communications can be used, which should be understood by those ordinary skill in the art.

In embodiments comprising several physical interaction events, it may be that several acceptable keys can be determined. In some embodiments, the first matched, last matched, or any matched key may be used for secure communications. In further embodiments, the key generation comprises a first pass as described, and if none of those keys are acceptable, the devices users further variants to generate additional keys based on the rounded time value secrets (or time secrets) until a valid (e.g., common) key is found. In other embodiments, key generation may be expanded across variants until a threshold level of failures or time value secret variants is reached, signifying that finding a suitable key is unlikely. The user is then instructed to restart the authentication process to attempt to generate/find a suitable key.

In some embodiments, the devices sample the sensor readings at different rates or in different time scales. These differences in sampling rates may be made irrelevant by the rounding or truncation process discussed previously. Alternatively, the key derivation functions of each device may be designed such that outputs of the key derivation functions are identical respective to the disparate timestamps produced by each device at substantially the same time, as should be appreciated by those of ordinary skill in the art. In other words, for the devices communicate using an identical key, they do not need to sample the sensor readings at an identical rate or use identical time scales.

In other embodiments, a device may be paired with a plurality of other devices simultaneously in a broadcast manner. Suitable ways of performing broadcast pairing may be using light or sound, as the multi-directional travel of these physical phenomena permits interaction between more than two devices at a time. Alternatively, a user may physically contact (e.g., knock) several devices simultaneously. For example, stacking two devices containing accelerometers and knocking them with a smartphone causes accelerometers on all three devices to report spikes. The devices then proceed to generate keys and validate secure communication in a manner consistent with that described in respect to FIG. 4.

Throughout this specification, the term "physical interaction" refers to any interaction using any physical medium but not communication by prior art electronic communication methods, wirelessly and wired, as understood by those of ordinary skill in the art at the time of filing of this application. Throughout this specification, the term physical contact refers specifically to matter-to-matter contact. Throughout this specification, the term random or randomly refers to inherent randomness in human activities (e.g., caused by lack of cognitive and/or physical precision), bona fide attempts at randomness by a human (regardless of whether statistical randomness is or is not achieved), or pseudo-randomness created by computer processes based on sufficient entropy as known to persons of ordinary skill in the art.

Methods of establishing secure communications are discussed in the following documents, which are incorporated by reference to form part of the present disclosure as if fully set forth herein: U.S. Pat. Nos. 8,907,768 B2 and 9,176,543 B2, both entitled "ACCESS USING A MOBILE DEVICE WITH AN ACCELEROMETER;" Saxena, Nitesh, and Borhan Uddin, "Blink 'Em All: Scalable, User-Friendly and Secure Initialization of Wireless Sensor Nodes," Cryptology and Network Security: 8th International Conference, 2009, pp. 154-173; Lester, Jonathan, et al., "'Are you with me?'— Using Accelerometers to Determine if Two Devices are Carried by the Same Person," Lecture Notes in Computer Science, 2004, http://courses.cs.washington.edu/courses/cse477/projectwebs04sp/cse477c/project/docs/Readfor Th0415.pdf; Castelluccia, Claude, "Shake Them Up!" ACM, 16 Aug. 2016, pp. 3-25, www.usenix.org/legacy/publications/library/proceedings/mobisys05/tech/full_papers/castelluccia/castelluccia_new_html/index.html; and Castelluccia, Claude, "Shake Them Up!", ACM, 16 Aug. 2016, pp. 3-25, www.usenix.org/legacy/publications/library/proceedings/mobisys05/tech/full_papers/castelluccia/castelluccia_new_html/index. html.

As may be recognized by those of ordinary skill in the pertinent art based on the teachings herein, numerous changes and modifications may be made to the above-described and other embodiments of the present invention without departing from its scope. Accordingly, it is to be understood that this detailed description is to be taken as illustrative and not to be limited to the specific embodiments disclosed and that modifications and other embodiments are intended to be included within the scope of the invention. It should be understood that although certain features are described in the embodiments in combination with certain other features, that the invention is not limited to such combinations, and the invention contemplates and covers the features described herein in any and all possible combinations. Further, although specific terms are employed herein, they are used in a generic and descriptive sense only and not for purposes of limitation. Accordingly, this detailed description of embodiments is to be taken in an illustrative as opposed to a limiting sense.

What is claimed is:

1. A method comprising:
detecting, with a sensor of a first computing device, a first physical interaction between the first computing device and a second computing device;
storing, in a memory of the first computing device, a timestamp of the first physical interaction;
detecting, with the sensor of the first computing device, a second physical interaction between the first computing device and the second computing device;
storing, in the memory of the first computing device, a timestamp of the second physical interaction;
determining, by a processor of the first computing device, a first time value secret using, based on or derived from the timestamp of the first physical interaction and the timestamp of the second physical interaction;
generating, with the processor of the first computing device; a first encryption key using, based on, or derived from the first time value secret;
encrypting, by the processor of the first computing device, a first encrypted validation message using the first encryption key;
transmitting, with a transceiver of the first computing device, a set of encrypted validation messages comprising the first encrypted validation message;
receiving, with the transceiver of the first computing device, an encrypted confirmation message from a second computing device;
attempting to decipher, by the processor of the first computing device, the encrypted confirmation message using the first encryption key; and
when said attempt to decipher the encrypted confirmation message is successful, transmitting, with the transceiver of the first computing device, a plurality of messages encrypted with the first encryption key; and
wherein the method further comprises:
calculating, by the processor of the first computing device, a variant timestamp of the second physical interaction by adding or subtracting a unit of time to the timestamp of the second physical interaction;
determining, by the processor of the first computing device, a second time value secret using, based on or derived from the timestamp of the first physical interaction and the variant timestamp of the second physical interaction;

generating, with the processor the first computing device; a second encryption key using, based on, or derived from the second time value secret encrypting, by the processor of the first computing device, a second encrypted validation message using they second encryption key; and transmitting, with a transceiver of the first computing device, a set of encrypted validation messages comprising the second encrypted validation message prior to receiving the encrypted confirmation message;

wherein, when said attempt to decipher the encrypted confirmation message fails to decipher the encrypted confirmation message, attempting to decipher, by the processor of the first computing device, the encrypted confirmation message using the second encryption key; and when said attempt to decipher the encrypted confirmation message using the second encryption key is successful, transmitting, with the transceiver of the first computing device, a plurality of messages encrypted with the second encryption key.

2. A method according to claim 1, wherein the step of generating, with the processor the first computing device; a first encryption key includes using a key derivation function.

3. A method according to claim 1, wherein the determining step comprises calculating, by the processor of the first computing device, a difference between the timestamp of the first physical interaction and the timestamp of the second physical interaction.

4. A method according to claim 1, wherein the determining step further comprises rounding of the first time value secret, by the processor of the first computing device, to a number of significant digits less than a response time of the sensor.

5. A method according to claim 1, wherein the sensor is (i) an accelerometer, (ii) a microphone (iii) a light sensor, (iv) a button, or (v) an electromagnetic radiation sensor.

6. A method according to claim 1, wherein the sensor is an accelerometer and the timestamp of the first physical interaction corresponds to a peak accelerometer reading during the first physical interaction.

7. A method according to claim 1, further comprising:
generating, by the processor, a random user instruction timer; and
upon exhaustion of the random user instruction timer, generating an instruction, by the first computing device, to perform the first physical interaction.

8. A method according to claim 7, wherein the step of generating a random user instruction timer includes using an entropy accumulated in the first computing device.

9. A method according to claim 1, wherein the step of determining the first time value secret includes using entropy from one or more of the first physical interaction or the second physical interaction generated by a user during occurrence thereof.

10. A method according to claim 1, wherein
the generating step includes generating, with the processor the first computing device; a set of encryption keys using, based on, or derived from the first time secret and including the first encryption key, and
when said attempt to decipher the encrypted confirmation message fails to decipher the encrypted confirmation message, attempting, by the processor of the first computing device, to decipher the encrypted confirmation message using other of the keys of the set of encryption keys.

11. A non-transitory computer-readable medium having computer-readable instructions stored thereon that, when executed by a computing system, result in a method comprising:
detecting, with a sensor of the computing system, a first physical interaction between the computing system and a computing device;
storing, in a storage memory of the computing system, a timestamp of the first physical interaction;
detecting, with the sensor, a second physical interaction between the computing system and the computing device;
storing, in the storage memory, a timestamp of the second physical interaction;
determining, by a processor of the computing system, a first time value secret using, based on or derived from the timestamp of the first physical interaction and the timestamp of the second physical interaction;
generating, with the processor, a first encryption key using, based on, or derived from the first time value secret;
encrypting, by the processor, a first encrypted validation message using the first encryption key;
transmitting, with a transceiver of the computing system, a set of encrypted validation messages comprising the first encrypted validation message;
receiving, with the transceiver, an encrypted confirmation message from the computing device;
attempting to decipher, by the processor, the encrypted confirmation message using the first encryption key; and
when said attempt to decipher the encrypted confirmation message is successful, transmitting, with the transceiver, a plurality of messages encrypted with the first encryption key; and
wherein the method further comprises:
generating, by the processor, a random user instruction timer; and
upon exhaustion of the random user instruction timer, generating an instruction to perform the first physical interaction.

12. A computer-readable medium according to claim 11, wherein the computer-readable medium includes computer-readable instructions that, when executed by the computing system, result in the method further including:
calculating, by the processor, a variant timestamp of the second physical interaction by adding or subtracting a unit of time to the timestamp of the second physical interaction;
determining, by the processor, a second time value secret using, based on or derived from the timestamp of the first physical interaction and the variant timestamp of the second physical interaction;
generating, with the processor; a second encryption key using, based on, or derived from the second time value secret;
encrypting, by the processor, a second encrypted validation message using the second encryption key; and
transmitting, with the transceiver, a set of encrypted validation messages comprising the second encrypted validation message prior to receiving the encrypted confirmation message;
wherein, when said attempt to decipher the encrypted confirmation message fails to decipher the encrypted confirmation message, attempting to decipher, by the processor, the encrypted confirmation message using the second encryption key; and when said attempt to decipher the encrypted confirmation message using the second encryption key is successful, transmitting, with the transceiver, a plurality of messages encrypted with the second encryption key.

13. A computer-readable medium according to claim 11, wherein the step of generating the first encryption key includes using a key derivation function.

14. A computer-readable medium according to claim 11, wherein the step of determining the first time value secret includes calculating, by the processor, a difference between the timestamp of the first physical interaction and the timestamp of the second physical interaction.

15. A computer-readable medium according to claim 11, wherein the step of determining the first time value secret includes rounding of the first time value secret, by the processor, to a number of significant digits less than a response time of the sensor.

16. A computer-readable medium according to claim 11, wherein the step of generating a random user instruction timer includes using, by the processor, an entropy accumulated in the first computing device.

17. A computer-readable medium according to claim 11, wherein the step of determining the first time value secret includes using entropy from one or more of the first physical interaction or the second physical interaction generated by a user during occurrence thereof.

18. A computer-readable medium according to claim 11, including computer-readable instructions that, when executed by the computing system, result in the method further including:
   generating, with the processor, a set of encryption keys using, based on, or derived from the first time value secret and including the first encryption key, and
   when said attempt to decipher the encrypted confirmation message fails to decipher the encrypted confirmation message, attempting, by the processor, to decipher the encrypted confirmation message using other of the keys of the set of encryption keys.

19. A system comprising:
   a first computing device;
   a second computing device including
   a sensor for detecting physical phenomena;
   a transceiver for sending and receiving electronic communications;
   a storage memory;
   a processor for executing computer-readable instructions; and
   a non-transitory computer-readable medium having computer-readable instructions stored thereon that, when executed by the second computing device, result in a method comprising:
      detecting, with the sensor, a first physical interaction between the first computing device and the second computing device;
      storing, in the storage memory, a timestamp of the first physical interaction;
      detecting, with the sensor, a second physical interaction between the first computing and the second computing device;
      storing, in the storage memory, a timestamp of the second physical interaction;
      determining, by the processor, a first time value secret using, based on or derived from the timestamp of the first physical interaction and the timestamp of the second physical interaction;
      generating, with the processor, a first encryption key using, based on, or derived from the first time value secret;
      encrypting, by the processor, a first encrypted validation message using the first encryption key;
      transmitting, with the transceiver, a set of encrypted validation messages comprising the first encrypted validation message;
      receiving, with the transceiver, an encrypted confirmation message from the first computing device;
      attempting to decipher, by the processor, the encrypted confirmation message using the first encryption key; and
      when said attempt to decipher the encrypted confirmation message is successful, transmitting, with the transceiver, a plurality of messages encrypted with the first encryption key; and
   wherein the method further comprises:
      calculating, by the processor, a variant timestamp of the second physical interaction by adding or subtracting a unit of time to the timestamp of the second physical interaction;
      determining, by the processor, a second time value secret using, based on or derived from the timestamp of the first physical interaction and the variant timestamp of the second physical interaction;
      generating, with the processor, a second encryption key using, based on, or derived from the second time value secret
      encrypting, by the processor, a second encrypted validation message using the second encryption key; and
      transmitting, with the transceiver, a set of encrypted validation messages comprising the second encrypted validation message prior to receiving the encrypted confirmation message;
      wherein when said attempt to decipher the encrypted confirmation message fails to decipher the encrypted confirmation message, the method further comprises attempting to decipher, by the processor, the encrypted confirmation message using the second encryption key; and
      wherein when said attempt to decipher the encrypted confirmation message using the second encryption key is successful, transmitting, with the transceiver, a plurality of messages encrypted with the second encryption key.

20. A system according to claim 19, wherein the step of generating the first encryption key includes using a key derivation function.

21. A system according to claim 19, wherein the step of determining the first time value secret includes calculating, by the processor, a difference between the timestamp of the first physical interaction and the timestamp of the second physical interaction.

22. A system according to claim 19, wherein the step of determining the first time value secret includes rounding of the first time value secret, by the processor, to a number of significant digits less than a response time of the sensor.

23. A system according to claim 19, wherein the sensor is (i) an accelerometer, (ii) a microphone (iii) a light sensor, (iv) a button, or (v) an electromagnetic radiation sensor.

24. A system according to claim 19, wherein the sensor is an accelerometer and the timestamp of the first physical interaction corresponds to a peak accelerometer reading during the first physical interaction.

25. A system according to claim 19, further including a display screen including a graphical user interface, and the computer-readable medium includes computer-readable instructions that, when executed by the second computing device, result in the method further including:
   generating, by the processor, a random user instruction timer; and
   upon exhaustion of the random user instruction timer, generating an instruction on the display screen to perform the first physical interaction.

26. A system according to claim 25, wherein the step of generating a random user instruction timer includes using, by the processor, an entropy accumulated in the first computing device.

27. A system according to claim 19, wherein the step of determining the first time value secret includes using entropy from one or more of the first physical interaction or the second physical interaction generated by a user during occurrence thereof.

28. A system according to claim 19, wherein the computer-readable medium includes computer-readable instructions that, when executed by the second computing device, result in the method further including:
   generating, with the processor, a set of encryption keys using, based on, or derived from the first time value secret and including the first encryption key, and
   when said attempt to decipher the encrypted confirmation message fails to decipher the encrypted confirmation message, attempting, by the processor, to decipher the encrypted confirmation message using other of the keys of the set of encryption keys.

\* \* \* \* \*